Figure 1:
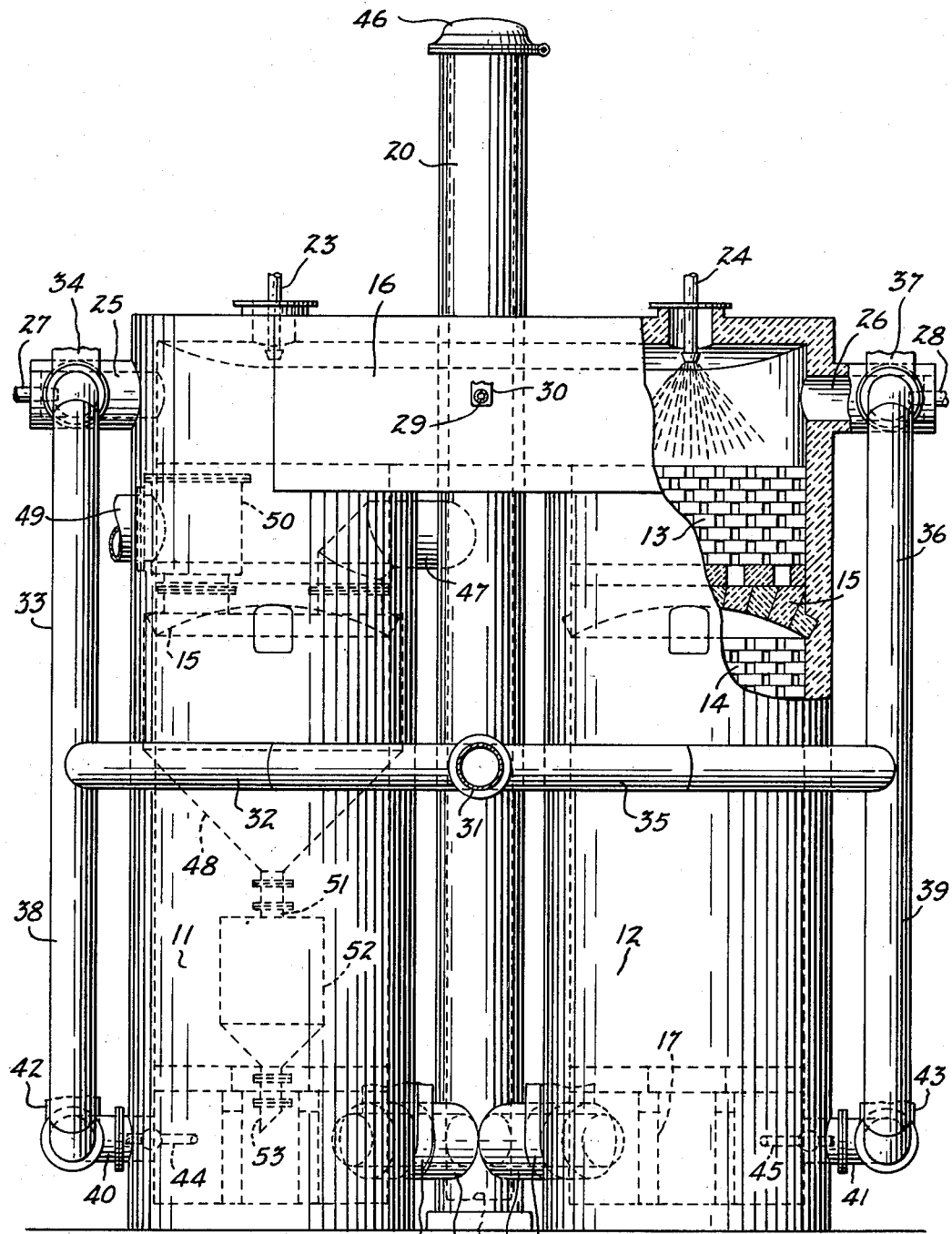

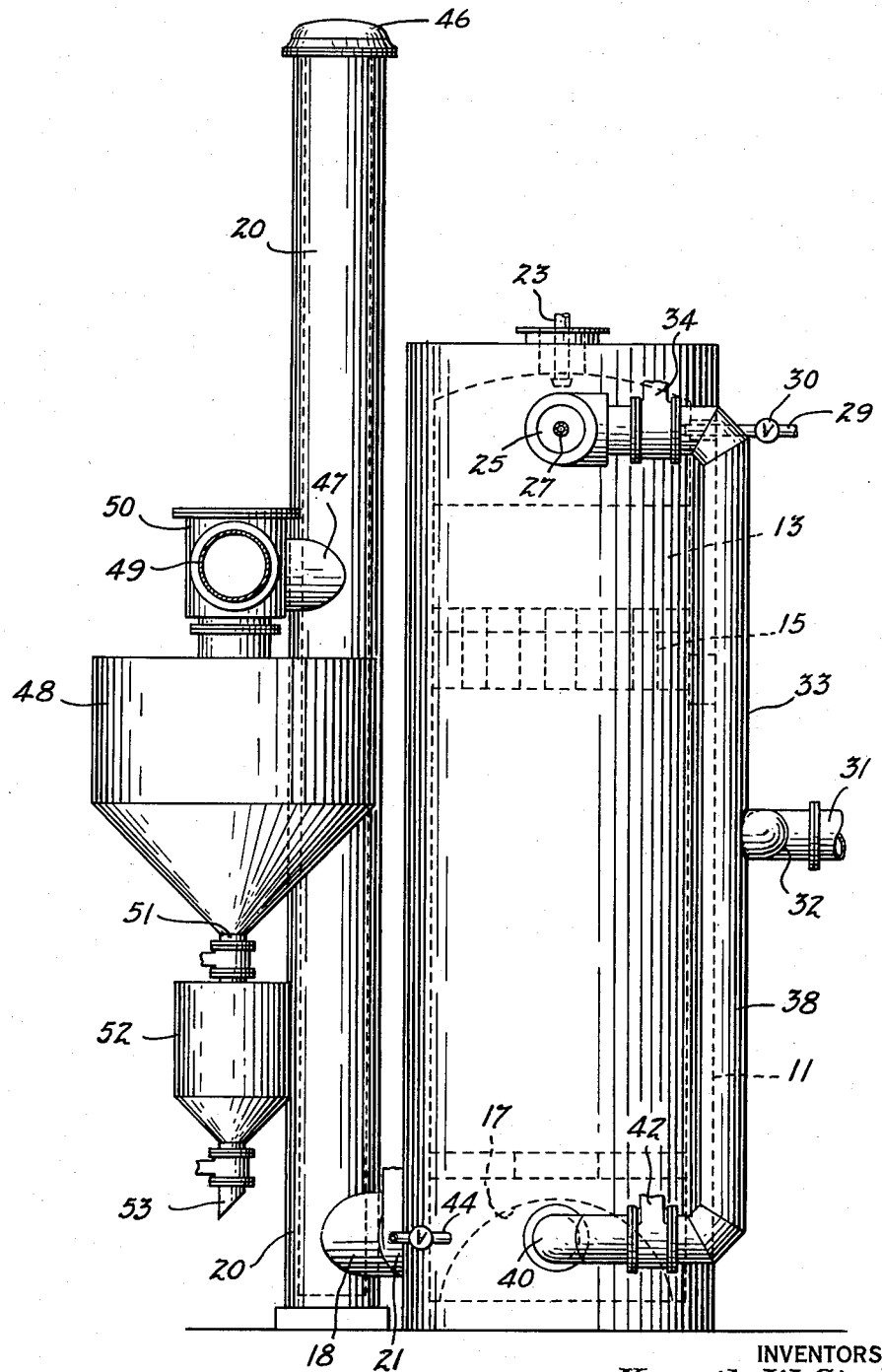

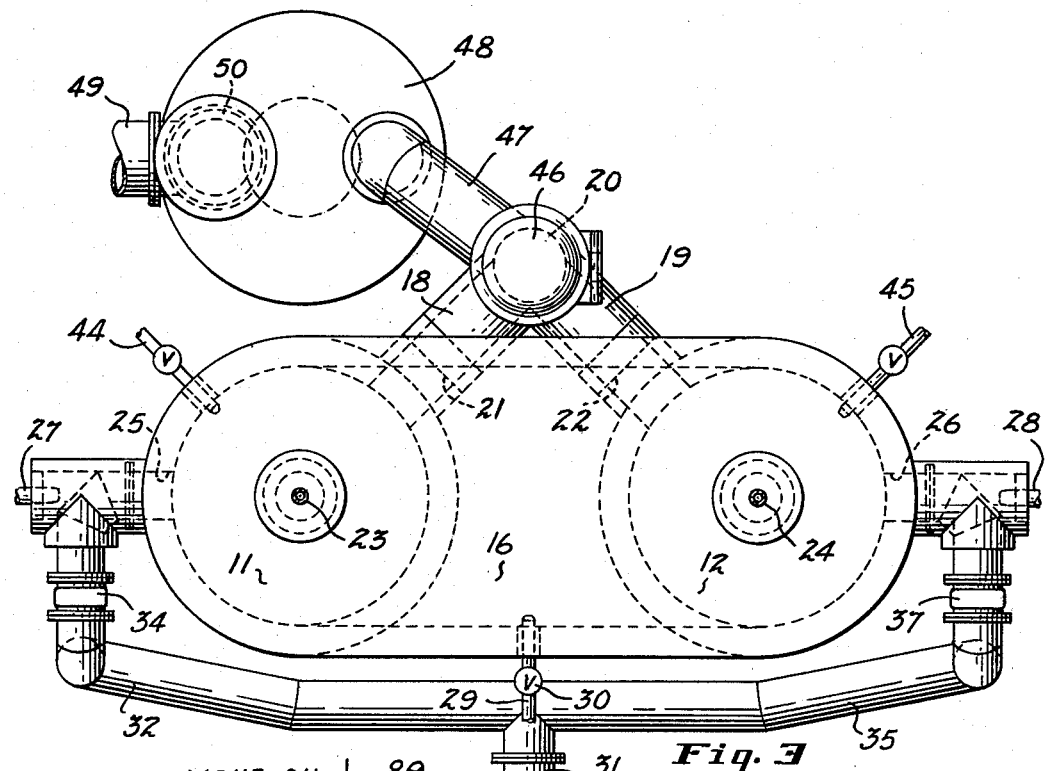
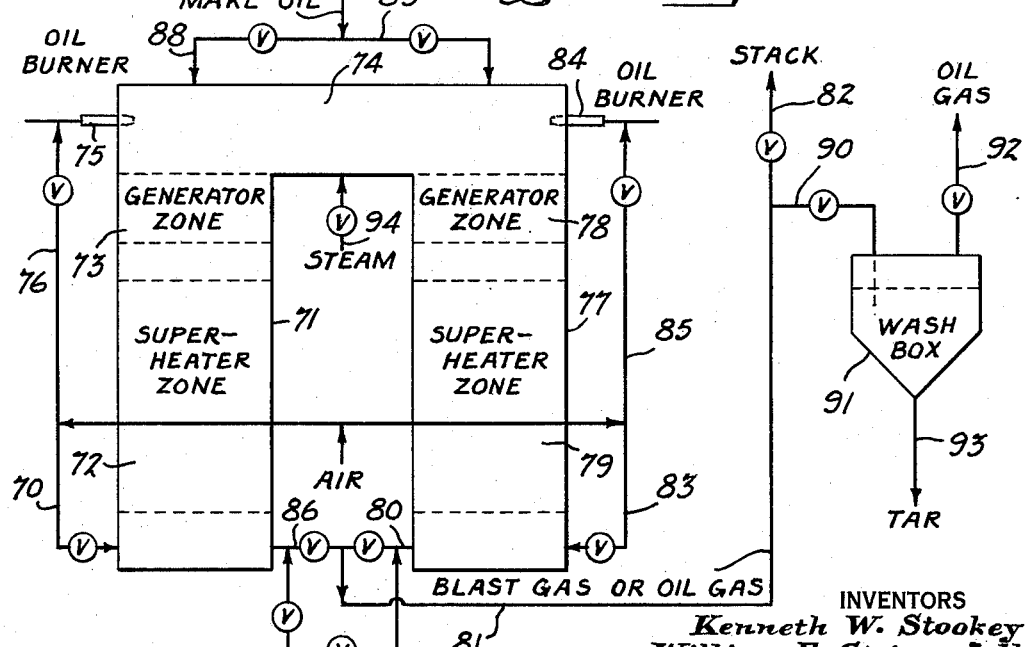

United States Patent Office

2,714,058
Patented July 26, 1955

2,714,058

METHOD AND APPARATUS FOR MAKING OIL GAS

Kenneth W. Stookey, Cleveland Heights, and William E. Steinwedell and Robert T. Kyle, Cleveland, Ohio, assignors to The Gas Machinery Company, Cleveland, Ohio, a corporation of Ohio Application October 3, 1949, Serial No. 119,364

4 Claims. (Cl. 48—74)

The present invention relates to new and improved processes for making oil gas and apparatus for carrying out said processes.

When making oil gas from a petroleum oil, the oil is passed into a heated zone, usually by spraying in an atomized form, and is there converted into normally gaseous hydrocarbons by cracking or other pyrolytic reactions. Heat is normally supplied to the heated zone by burning heat oil therein so as to build up a reservoir of heat which is later consumed in converting the oil to oil gas. Obviously, the economic character of the process depends upon the efficient utilization of the heat. It is, therefore, desirable to retain as much heat as possible in the oil gas set by reducing to a minimum the loss of heat in the flue gases derived from the burning of the heat oil and to utilize as much of the heat, stored in the set, as possible for the cracking of the oil to oil gas.

In the past conventional three shell water gas sets having a generator, carburetor and superheater have been converted into oil gas sets by installing checkerbrick in the generator and carburetor and using both the generator and carburetor, either in series or in parallel, as gas cracking zones and using the superheater as a fixing or reforming zone in which the oil gas is made more stable and fixed. While the use of converted sets enables one to obtain oil gas having desirable characteristics, they do not provide an efficient use of the heat supplied and it is difficult to control the temperatures throughout the set.

According to the present invention, new and improved processes and apparatus therefor are provided by which a far greater efficiency is obtained and by which the temperatures throughout the set can be easily and closely controlled.

In its broadest aspect the process involves the use of two shells which communicate with each other at the top through a cross-over passage or tunnel. The set comprises a first superheater zone, a first generator zone superimposed thereon, a crossover zone, a second generator zone and a second superheater zone disposed below said second generator zone. A substantial portion of each superheater zone also serves as a regenerative zone during at least a part of the process cycle. The superheater zones communicate with one or more stacks for venting flue gas or with one or more wash-boxes for washing, cooling, and sealing the oil gas produced.

One of the principal innovations of the present invention is the introduction of the heat oil at one or more points in the set which enables a substantial amount of heat to be stored in the crossover zone as well as in the generator zones and superheater zones, which heat is later used for making oil gas. Due to applicant's invention less heat is lost when the flue gases are vented and more heat is stored in the set for use in making oil gas. Also by virtue of the particular procedures described hereinafter, one can readily control the temperature at all critical points in the set.

The invention will now be described in greater detail by reference to the accompanying drawings in which:

Figure 1 is a front elevation, partly in section, of a gas making machine according to the present invention, Figure 2 is a side elevation of the machine shown in Figure 1, Figure 3 is a top plan view of the machine shown in Figures 1 and 2, Figure 4 is a schematic flow diagram of the process carried out in the machine shown in Figures 1, 2 and 3, and Figures 5 and 6 are schematic flow diagrams of modified processes according to the present invention.

Referring to Figures 1, 2 and 3, the oil gas machine comprises two vertical shells 11 and 12, each of which contains two sections of ceramic checker brick 13 and 14, respectively. The upper sections 13 are shorter than the lower sections 14, and are supported by arches 15 of conventional design. The upper sections 13 will be termed oil gas generator zones as will be described more fully hereinafter while the lower sections 14 will be termed superheater zones. It will be understood that, although a major proportion of the oil gas is generated in zones 13, this does not preclude some generation of oil gas in zones 14. If desired, the arches 15 may be eliminated and continuous sections of checkerbrick may be provided, the upper portions of which would be the generator zones and the lower portions the superheater zones. Though specific zones are referred to it will be understood that the reactions taking place therein occur continuously throughout the shells without any clear line of demarcation.

At the top of the shells 11 and 12 a relatively large transverse passage or cross-over 16 is provided affording direct and unrestricted communication between the tops of shells 11 and 12 adjacent the tops of the checker brick sections 13. The width of the crossover 16 is substantially the same as the inside diameter of the shells 11 and 12, thus providing a large combustion volume which causes a large heat release in the crossover as will be described more fully hereinafter. It will be seen, therefore, that the machine has a form resembling an inverted U. The shells 11 and 12 as well as the crossover 16 are lined with refractory material.

The lower checkerbrick sections 14 are supported on conventional arches 17, thereby providing a relatively clear space at the bottoms of the shells 11 and 12.

At the bottoms of the shells 11 and 12 are provided lines 18 and 19 communicating with the bottom of a stack 20. These lines 18 and 19 are provided with directional valves 21 and 22 of conventional design.

At the top of the machine and substantially vertically above the shells 11 and 12 are provided spray nozzles 23 and 24 for supplying make oil to the machine. The opposite ends of the cross-over 16 are provided with inlets 25 and 26, in which oil burners 27 and 28 are disposed so that the flame therefrom will be directed through said cross-over 16 in a substantially horizontal direction. The cross-over 16 is provided with a steam inlet line 29 which is provided with a valve 30. Air can be introduced through line 31 and passed through lines 32 to 33 to inlet 25 for supporting combustion of burner oil injected at burner 27. A valve 34 is provided for controlling the passage of air through line 33. Air can also be passed through lines 35 and 36 for supplying air to the inlet 26 for supporting the combustion of burner oil which is introduced through burner 28. A valve 37 controls the passage of air in line 36. Air lines 38 and 39 also extend downwardly from lines 32 and 35 and communicate with air inlet means 40 and 41 at the bottom of shells 11 and 12. Adjacent the air inlet means 40 and 41 are provided blast valves 42 and 43 of conventional design for controlling the introduction of air.

At the bottom of the shells 11 and 12 there is also provided steam inlet means 44 and 45 for introducing steam into the bottoms of the shells.

The stack 20 is provided with a conventional stack valve 46 at the top thereof and is provided also with a gas outlet 47 which communicates with a wash box 48 of conventional design. The gases introduced into the wash box 48 are withdrawn through line 49 which is provided with an angle valve 50. The tars and other liquefiable hydrocarbons which are collected in the wash box 48 are passed through valved line 51 to a displacement tank 52 from which they may be withdrawn when desired through valved outlet 53. The gases withdrawn through line 49 may be passed to a gas holder or to a distribution system (not shown).

When carrying out the process of the present invention, the make oil may be a gas oil or other hydrocarbon liquid, such as crude oil. The process of the present invention is particularly adapted for use with oils having high Conradson carbon content such as Bunker C oil. The make oil can be introduced through one or both of the spray nozzles 23 and 24 onto the hot checkerbrick sections 13. The gases formed by cracking are passed downwardly through the shell or shells and the checkerbrick sections 14 and then through valved line 18 and/or 19 to the stack 20 and thence through line 47 to the wash box 48 and are withdrawn through line 49. During the blasting or heating up stage of the apparatus, heat oil is introduced through one or both of burners 27 and 28 where it is admixed and burned in the presence of air from lines 33 and/or 36, thus supplying heat to checkerbrick sections 13 and 14. The flue gases are passed from the bottom of shells 11 and/or 12 through lines 18 and/or 19 to stack 20 and thence out through the top of said stack.

In the apparatus described above, different processes for making oil gas may be carried out, one of which is illustrated diagrammatically in Figure 4. Immediately following a make run and a steam purge, air is introduced through line 70 to the bottom of shell 71 beneath the superheater zone 72. This air passes upwardly through the superheater zone 72, the generator zone 73 and then through the cross-over 74. This causes the superheater zone 72 to be cooled by the incoming air from a temperature between about 1200° F. and 1500° F. to a temperature between about 900° F. and 1100° F. while in the upper part of shell 71, the air burns any carbon which may have been deposited on the checker brick in generator zone 73 during the preceding make run thus reducing the requirements for burner oil. Burner oil is introduced through nozzle 75 together with air from line 76. The hot combustion products coming from generator zone 73 consisting substantially of $CO_2$, nitrogen and excess superheated air are mixed with the burner oil combustion gases and pass together through the cross-over 74 to the top of shell 77 and thence downwardly through the generator zone 78 and superheater zone 79 to the bottom of said shell. The hot combustion gases supply heat to the cross-over 74, the generator zone 78, and the superheater zone 79. These gases which have given up large quantities of heat are then passed to the stack 82 via line 80 and 81. This blast stage is continued until the superheater zone 72 has a temperature of from about 900° F. to about 1100° F. The generator zone 73 will have a temperature of from about 1200° F. to about 1500° F. and the cross-over 74 and generator zone 78 will have a temperature of about 1800° F. The temperature of the superheater 79 will be between about 1600° F. and 1800° F. The blast stage is then reversed and air is supplied through line 83 to the bottom of shell 77 beneath the superheater zone 79. This air passes upwardly through the shell 77 and generator zone 78 where it burns off any carbon which may have been deposited during the make run and which has not been burned off by an excess of air during the preceding blast stage. Heat oil is supplied to burner 84 and air is supplied through line 85 to support combustion of the heat oil. The combustion products are passed through the cross-over 74 and downwardly through the generator zone 73 and superheater zone 72 and thence to the stack 82 via lines 86 and 81. The second or reverse blast stage is continued until the superheaters 72 and 79 have temperatures of from about 1300° F. to about 1700° F. and the generator zones 73 and 78 have temperatures of from about 1700° F. to about 1800° F. It will, of course, be clear that the above mentioned temperatures can be obtained not only by controlling the length of time that the heat oil is introduced but also by controlling the relative rates of introduction of heat oil and air whereby the heat of the combustion products can be controlled. Also, if desired, the blast stages may be carried out in reverse order without altering the operation of the process.

After the generator zones 73 and 78 and the superheater zones 72 and 79 have been heated to the desired temperatures, the heat oil and air are cut off. At this time steam may be introduced through lines 87 and 89 to the bottom of shell 77 so as to sweep out any combustion gases remaining therein and also any air or oxygen which may not have been consumed during the blast stages. This steam will pass upwardly through shell 77, through the crossover 74 and down through shell 71 and then out through lines 86 and 81. The machine is now ready for the make run. In the modification described, make oil may be introduced simultaneously through lines 88 and 89 respectively into the top of the shells 71 and 77. The make oil is sprayed into generator zones 73 and 78 where it is cracked to hydrocarbon gases. These gases pass downwardly through the generator zones and superheater zones and thence through lines 80 and 86 to line 81. These product gases are passed from line 81 through line 90 to the wash box 91 where condensable hydrocarbons and tar are removed from the gaseous hydrocarbons which are withdrawn from the washbox through line 92. The tar which collects in the bottom of wash box 91 may be withdrawn from the system through line 93. During the make run the generator zones 73 and 78 become progressively cooler and when this temperature has decreased to temperatures between about 1500° F. and 1600° F., the introduction of make oil is discontinued. The superheater zones will then have a temperature between about 1200° F. and 1500° F. Steam is then admitted through line 94 to the crossover 74 so as to sweep out the oil gas remaining in the set. As soon as all of the oil gas has been purged from the set, the introduction of the steam is discontinued and the generator zones are reheated by repeating the above-mentioned blast stages.

If desired, during the introduction of make oil through lines 88 and 89, steam may be introduced through line 94 so that the cracking of the make oil can take place in the presence of steam.

A modification of the above-mentioned procedure may be carried out after the blast stages by introducing a small amount of steam through line 86 into the bottom of shell 71, while make oil is being introduced through lines 88 and 89. The steam rises through the shell 71 and moves oil, oil vapors, and oil gas which is generated in generator zone 73 through the crossover 74 to the top of shell 77 where the oil and oil vapors are cracked and mixed with the oil gas generated in zone 78 from the make oil introduced through line 89. In this modification all of the oil gas passes downward through shell 77 and out through lines 80 and 81 to line 90 and the wash box 91. After the temperature of generator zone 78 has dropped to a point at which the make oil is not efficiently converted into oil gas, the steam is discontinued through line 86 and may be passed instead through line 80 into the bottom of shell 77 so that the gas making stage is reversed; the introduction of make oil being continued through lines 88 and 89. The steam passing upwardly through shell 77 moves whatever oil gas is generated in zone 78 and oil and oil vapors through the crossover 74 and downwardly through shell 71 together with the oil gas generated in zone 73 from the oil introduced through line 88. In this instance all of the oil gas is withdrawn through lines 86 and 81 to line 90 and the wash box 91. At the end of the make run which includes the two above mentioned stages, the make oil is cut off and steam is continued through line 80 for a time sufficient to clear the apparatus of oil gas before commencing the blast run described hereinbefore. If desired, steam may be introduced through line 94 into the crossover 74 either instead of or in addition to the steam introduced through line 80.

The relative quantities of make oil introduced through lines 88 and 89 may be varied in order to obtain maximum efficiency. For example, during either or both of the make-run stages, the quantity of oil introduced through line 88 or 89 may be greater or smaller than the amount introduced through the other line.

The characteristics of the final oil gas produced by this modification can also be controlled, within certain limits, by varying the quantity of steam introduced first through line 86 and subsequently through line 80, although generally only sufficient steam is introduced to move the oil gas into and through the crossover 74. If desired, in this modification, the make oil may be introduced solely through one or the other of lines 88 and 89 instead of through both of said lines. For example, if desired, during the first stage of the make run, oil may be introduced solely through line 89 whereas during the second stage of said make run, make oil may be introduced solely through line 88.

Still another modification of the present process is possible by carrying out the first stage of the blast run, for example, by introducing air through lines 70 and 76 to shell 71 while introducing burner oil through burner 75 until the temperature of generator zone 78 in shell 77 is between about 1700° F. and 1800° F. The temperature of superheater zone 72 will be between about 1000° F. and 1400° F., of generator zone 73 between about 1400° F. and 1600° F. while the temperature of superheater zone 79 will be between about 1300° F. and 1700° F. At this point steam may be introduced through line 86 to purge the apparatus of combustion gas and any excess air or oxygen that may be present. Make oil may then be introduced through line 89 to shell 77 for conversion into oil gas, said gas being withdrawn through lines 80 and 81. If desired, during this make run, steam may be introduced through line 86. When the temperature of generator zone 78 has decreased to a temperature of between about 1500° F. and 1600° F., the make oil is discontinued while steam is continued through line 86 in order to purge the apparatus. At this point the temperature of superheater zone 79 will be between about 1200° F. and 1500° F., while generator zone 73 will be between about 1350° F. and 1550° F. Superheater zone 72 will be between about 950° F. and 1350° F. The second stage of the blast run is now carried out by introducing air through lines 83 and 85 and by introducing burner oil through burner 84. This blast stage raises the temperature of generator zone 73 in shell 71 to from about 1700° F. to about 1800° F. and the other parts of the set to the temperatures mentioned above in reverse relation. A short steam purge is effected by introducing steam through line 80 in the manner described hereinbefore. Subsequently make oil may be introduced through line 88 down into generator zone 73 for conversion into oil gas, the product gas being removed through lines 86 and 81. If desired, steam may be introduced through line 80 into the bottom of shell 77 during the make run. When the temperature of generator zone 73 has reached the lower temperature of from about 1500° F. to about 1600° F., the make oil is discontinued through line 88 and the steam through line 80 is continued to effect a purge of the oil gas remaining in the set. The above described cycle is then repeated by carrying on the first stage of the blast run.

It will be noted from the foregoing description of the various modes of operation that the crossover 74, as shown in Figure 4, serves a combination of functions. For example, the crossover 74 receives heat from both burner 75 and burner 84 and/or from the burning of the carbon deposited in shell 71 and shell 77. The heat stored in the crossover 74 is useful for superheating steam introduced through line 94 during the introduction of make oil as described hereinbefore. The crossover 74 serves as an additional cracking zone when make oil is passed therethru, for example, when make oil is introduced thru line 88 and is moved through the crossover 74 by steam which is introduced through line 86.

Figure 5:
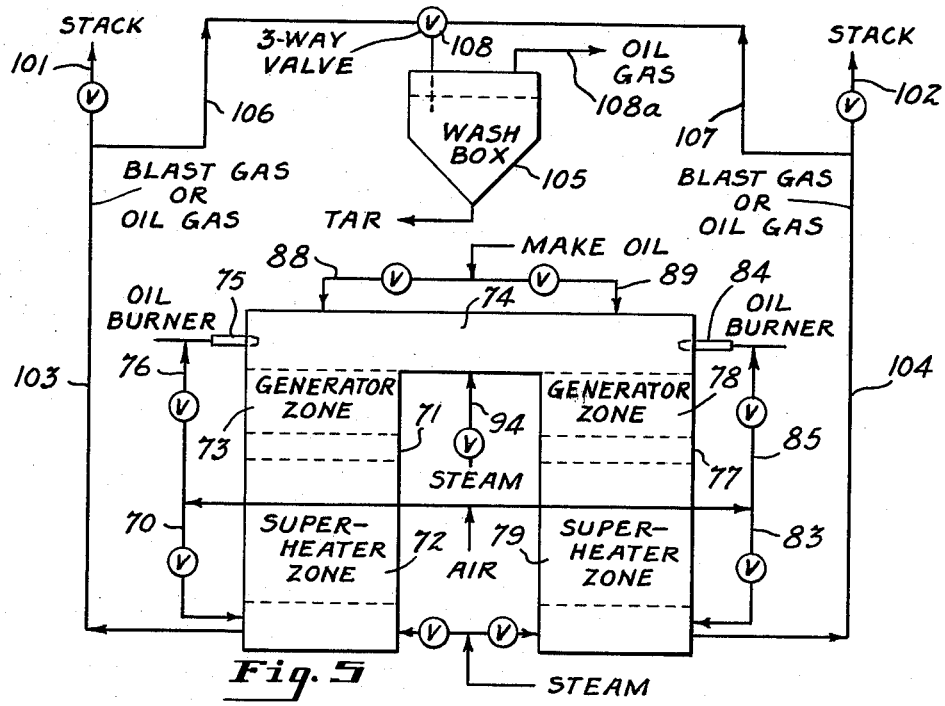
Figure 6:
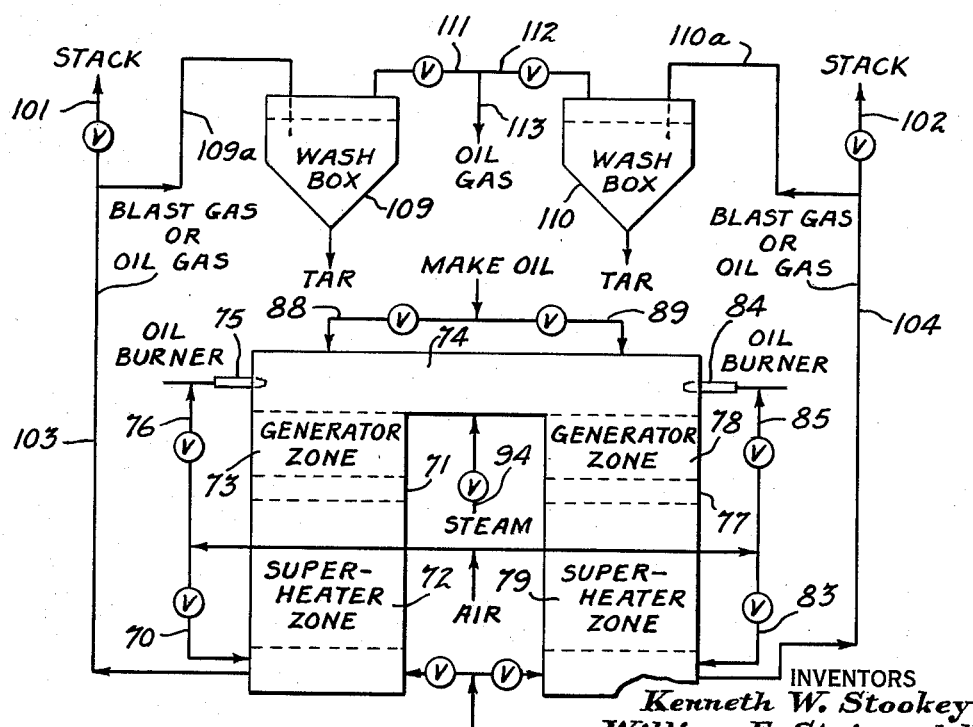

According to the schematic flow diagram of Figure 4 as well as the apparatus shown in Figures 1, 2, and 3, a single stack 82 and a single wash box 91 is utilized. However, if desired, it is possible to provide two stacks 101 and 102, each of which is connected independently to one of the shells through lines 103 and 104 respectively as shown in Figures 5 and 6. According to Figure 5, the oil gas is passed through one or both of lines 103 or 104 and is diverted to a single wash box 105 through lines 106 and/or 107 and through a socalled three-way valve 108, which permits gas to enter the wash box 105 through line 106 or 107 or through both of lines 106 and 107. The washed gases are withdrawn thru line 108a. In the modification illustrated in Figure 6, two wash boxes 109 and 110 are provided, the gas from lines 103 and/or 104 being passed respectively through one of the wash boxes 109 and 110, via lines 109a and 110a. The washed oil gas is withdrawn through either or both of lines 111 and/or 112 to a common outlet 113.

One advantage of the arrangements disclosed in Figures 5 and 6 is the elimination of the need for the relatively expensive directional valves 18 and 19 disclosed in Figures 1, 2 and 3, since it is possible, in the modifications shown in Figures 5 and 6, to remove the necessary valves to a point sufficiently distant from the gas making apparatus so that the gas will have cooled sufficiently to permit the use of less expensive valves. In Figure 5, a three-way valve may be used at a point adjacent the wash box whereas in Figure 6 it is possible to place the valves in the outlet lines from the wash boxes.

It has been found that each of the two blast stages may take about 2 minutes in order to attain the desired temperatures whether the stages immediately succeed one another or whether a make run intervenes. When the make runs are alternated with the blast stages, each of them may consume approximately 2 minutes but when the make runs are carried out simultaneously, in parallel, in each of the shells a total of about 2 minutes will suffice for both make runs. It will be seen therefore, that in one instance about 8 minutes are required for a complete cycle while the simultaneous parallel make runs require only about 6 minutes. This difference in time enables the gas set according to the present invention to produce, when necessary, about 33⅓% more gas during any fixed period of time by using the 6 minute cycle instead of the 8 minute cycle. It will be understood, of course, that the above periods of time may be varied. For example, if desired either one or both of the blast stages and/or make runs can be increased or decreased by about 50% depending upon the desired results and raw materials used.

The various flow rates of the blast air, burner oil, steam and make oil, can of course be varied depending upon the quantity and characteristics of oil gas to be produced. Also for any particular type of oil gas desired the flow rates are varied depending upon the types of burner oil and make oil employed. Generally speaking the flow rates will be in proportion to the cross sectional area of the shells. Since the diameters of the shells may vary from about 7 feet to about 20 feet it will be seen that the flow rates may vary in the ratio of about 1 to 8.

When employing Bunker C oil for the production of 1000 B. t. u. oil gas in a set having shells with 11 foot diameters the blast air may be introduced through lines 76 and/or 85 at the rate of about 12,000 C. F. M. and through lines 70 and/or 83 at the rate of about 16,000 C. F. M. Burner oil may be introduced through each of burners 75 and 84 at about 8 gallons per minute, although this rate might be reduced due to heat supplied to the set by the burning of deposited carbon. Under some conditions the burning of deposited carbon may supply substantially all of the required heat. The make oil may be introduced through spray nozzles at a rate of about 105 gallons per minute.

For simplification, various conventional parts of the oil gas set have been shown diagrammatically or with parts broken away and other conventional parts for recording temperatures and flow controlling valves, thermocouples and the like have been omitted since such parts are well known to those skilled in the art.

Although the present invention has been described with reference to the apparatus and flow diagrams shown in the drawings it is to be understood that we do not wish to be limited thereby but rather it is intended that all variations and modifications which would occur to one skilled in the art are not to be excluded.

What is claimed is:

1. A process for making oil gas by pyrolitic treatment of oil in an oil gas set having two shells each containing an oil cracking zone and a cross-over zone connecting the two shells at the top thereof, said process comprising heating one of said shells by passing air upwardly through said other shell, introducing heat oil into the top of one of said two shells, burning said fuel therein, the combustion products of the air and fuel passing downwardly through said first mentioned shell to supply heat thereto, heating said other shell by passing air upwardly through said first mentioned shell, introducing heat oil into the top of one of said two shells, burning said fuel therein, the combustion products of the air and fuel passing downwardly through said other shell to supply heat thereto, introducing make oil simultaneously into the top of both of said shells for conversion into oil gas, passing said oil and converted oil gas downwardly through said shells and withdrawing oil gas simultaneously from the bottoms of each of said shells.

2. Apparatus for producing oil gas from a hydrocarbon oil by a cyclic process which includes alternate blast runs and gas make runs, said apparatus comprising two vertical shells, refractory checkerbrick structures within said shells, a refractory lined cross-over member affording communication between the tops of said shells, valved air inlet means at the top of said shells for introducing air into one of said shells and subsequently into the other of said shells during alternate blast runs, valved air inlet means at the bottom of each of said shells for introducing air into one of said shells and subsequently into the other of said shells during said alternate blast runs, heat oil spray means at the tops of each of said shells for introducing heat oil into the tops of said shells at an angle to the vertical and subsequently into the top of the other of said shells at an angle to the vertical during said alternate blast runs, make oil spray means at the tops of said shells and separated from said heat oil spray means for introducing make oil vertically and downwardly into said shells during make runs, a stack, a valve at the top thereof for controlling the venting of combustion gases during said blast runs, conduits connecting the bottoms of said shells with the bottom of said stack, and valve means for controlling communication through said conduits.

3. Apparatus as claimed in claim 2 and further comprising a valve controlled outlet adjacent the top of said stack for take-off of oil gas during make runs.

4. Apparatus as claimed in claim 2 and further comprising a valve controlled outlet adjacent the top of said stack for take-off of oil gas during make runs and valved steam inlet means at the bottoms of said shells for introducing steam between said alternate blast runs and make runs for purging the apparatus.

References Cited in the file of this patent

UNITED STATES PATENTS

| | | |
|---|---|---|
| 781,836 | Lowe | Feb. 7, 1905 |
| 817,648 | Lowe | Apr. 10, 1906 |
| 819,666 | Lowe | May 1, 1906 |
| 883,466 | Lowe | Mar. 31, 1908 |
| 891,665 | Brasson | June 23, 1908 |
| 969,085 | Brasson et al. | Aug. 30, 1910 |
| 1,540,541 | Calvin | June 2, 1925 |
| 1,770,563 | Wannebo | July 15, 1930 |
| 2,131,696 | Brandegee et al. | Sept. 27, 1938 |
| 2,174,196 | Rogers | Sept. 26, 1939 |
| 2,192,815 | Johnson et al. | Mar. 5, 1940 |
| 2,208,123 | Duncan | July 16, 1940 |
| 2,580,766 | Hall | Jan. 1, 1952 |
| 2,580,767 | Hall | Jan. 1, 1952 |
| 2,605,176 | Pearson | July 29, 1952 |

FOREIGN PATENTS

| | | |
|---|---|---|
| 6,285 | Great Britain | April 1915 |
| 269,711 | Great Britain | Apr. 28, 1927 |

OTHER REFERENCES

American Gas Journal, October 1949, page 14.